United States Patent [19]

Ferrante

[11] Patent Number: 5,066,100
[45] Date of Patent: Nov. 19, 1991

[54] BINARY ALIGNMENT CORRECTOR
[75] Inventor: Ronald A. Ferrante, St. Charles, Mo.
[73] Assignee: McDonnell Douglas Corporation, St. Louis, Mo.
[21] Appl. No.: 632,928
[22] Filed: Dec. 24, 1990
[51] Int. Cl.⁵ .............................................. G02B 5/18
[52] U.S. Cl. ...................................... 359/569; 372/97; 359/566
[58] Field of Search ........................... 372/97, 102, 43; 350/162.17, 162.2

[56] References Cited
U.S. PATENT DOCUMENTS

| | | | |
|---|---|---|---|
| 3,980,389 | 9/1976 | Huignard et al. | 350/162.2 |
| 4,649,351 | 3/1987 | Veldkamp et al. | 372/97 |
| 4,862,467 | 8/1989 | Carter et al. | 372/18 |
| 4,933,649 | 6/1990 | Swanson et al. | 350/162.2 |
| 4,971,415 | 11/1990 | Hara et al. | 372/97 |

Primary Examiner—William L. Sikes
Assistant Examiner—Susan S. Morse
Attorney, Agent, or Firm—Guy R. Gosnell; Benjamin Hudson, Jr.; Timothy H. Courson

[57] ABSTRACT

There is provided by this invention a binary alignment corrector for correcting the directional errors caused by non-linear placement or "bowing" of diodes within laser arrays. The binary alignment corrector is an array of diffraction gratings with each diffraction grating corresponding to an individual diode of the laser array. Based on the amount of angular misalignment for a particular laser diode, the grating period of its corresponding diffraction grating is calculated. The binary alignment corrector is then fabricated by very large scale integration techniques such that each individual diffraction grating of the binary alignment corrector has a grating period sufficient to properly align its corresponding laser diode. Furthermore, a bias angle may be introduced in the alignment of each laser diode so that laser diodes which are only slightly misaligned may also be corrected.

6 Claims, 1 Drawing Sheet

BINARY ALIGNMENT CORRECTOR

BACKGROUND OF THE INVENTION

1. Field of the Invention

The present invention relates generally to means for correcting angular misalignment of the output from a diode laser array upon collimation, and more particularly to a computer-generated alignment grating corrector array which corrects the directional errors of the individual diodes of the diode laser array.

2. Brief Description of the Prior Art

Many current laser applications require a source of high power, highly coherent laser radiation. This source is typically a diode laser array in which multiple linear laser diode arrays are stacked to produce a compact, two-dimensional laser diode array. During the fabrication of such diode laser arrays, however, manufacturing errors may produce linear arrays which exhibit non-linear "bowing" such that the diodes are no longer horizontally aligned. The non-linear "bowing" of the laser diode array introduces an angular misalignment of the individual diodes upon collimation.

The angular misalignment is due to the differences in the vertical positioning of the output beams of the individual laser diodes as they are collimated. For example, a linear laser array with a substantially horizontal output that does not suffer from non-linear "bowing" will produce a series of output beams that will propagate in a substantially horizontal plane from the emitting facets of the laser array through the collimating lens. In contrast, laser diodes within the same exemplary laser array that are "bowed" or misaligned will produce output beams that will be positioned above or below horizontal and upon collimation will remain angularly misaligned with respect to the substantially horizontal plane.

These directional errors of a non-linear "bowed" diode laser array may be corrected by individually fabricated microprism arrays in which individual prisms are placed in each diode's path. Each prism must then be positioned such that there is no angular misalignment upon collimation. The use of microprism arrays in this application is extremely labor intensive and therefore cost prohibitive. Microprism arrays also tend to be fragile and to delaminate with time and temperature cycling.

It would thus be desirable to develop a correcting array for such non-linear "bowed" diode laser arrays which may be constructed from simple fabrication steps so as to be inexpensive. Furthermore, it would be desirable for the correcting array to be long-lasting and capable of withstanding wide variations in temperature without degradation.

SUMMARY OF THE INVENTION

There is provided by this invention a binary alignment corrector for correcting the directional errors caused by non-linear placement or "bowing" of diodes within laser arrays. The binary alignment corrector is an array of diffraction gratings with each diffraction grating corresponding to an individual diode of the laser array. Based on the amount of angular misalignment for a particular laser diode, the grating period of its corresponding diffraction grating is calculated. The binary alignment corrector is then fabricated by very large scale integration techniques such that each individual diffraction grating of the binary alignment corrector has a grating period sufficient to properly align its corresponding laser diode. Furthermore, a bias angle may be introduced in the alignment of each laser diode so that laser diodes which are only slightly misaligned may also be corrected.

DETAILED DESCRIPTION OF THE PREFERRED EMBODIMENT

Figure 1:
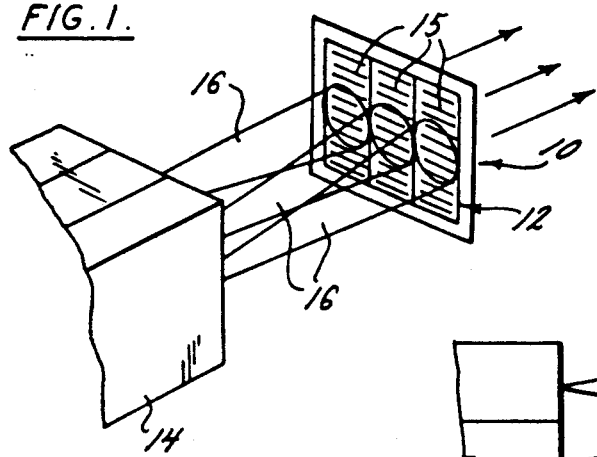
FIG. 1 illustrates a laser alignment system utilizing a binary alignment corrector.

The binary alignment corrector 10 is an array of diffraction gratings 12 with each individual grating of the array specifically designed to align the output of a diode from a diode laser array 14. By utilizing the binary alignment corrector 10 in combination with a diode laser array 14, as shown in FIG. 1, the angular misalignment of the laser array 14 is corrected so that a highly collimated output is produced. While the binary alignment corrector 10 is shown in FIG. 1 with a one dimensional array 14, it may be applicable to the correction of the outputs from either one or two dimensional arrays.

In order to fabricate the binary alignment corrector 10, the beam directional error of each laser diode of the laser array 14 must be determined. While there are numerous methods to measure a beam directional error, one manner in which this determination may be done is by means of the apparatus shown in FIG. 2. As illustrated, the output beams 16 of the diode laser array 14 are collimated by the collimating lenses 18. The collimated, but potentially misaligned, output is interfered with by an off-axis, mutually coherent reference wavefront 20 which may have been generated by a master oscillator laser source. The resulting interference pattern is measured in order to determine the interference fringe period. The interference pattern may be recorded by numerous devices present in the prior art, including a Charge Coupled Device (CCD) camera system 22 as shown in FIG. 2.

Figure 2:
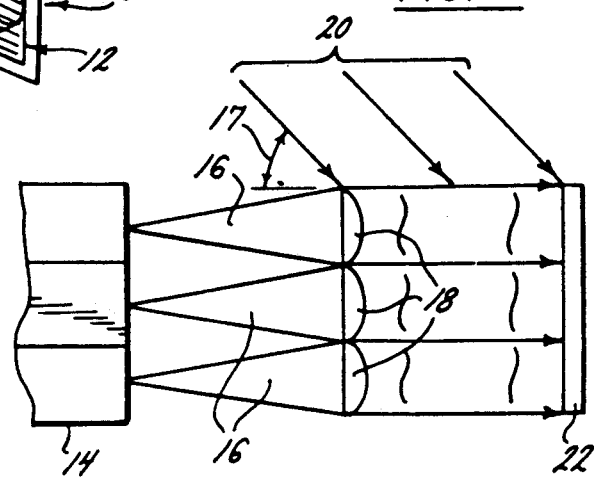
FIG. 2 illustrates a diode laser interferometric beam direction measurement system.

The directional error of each laser diode, termed the object beam angle $\theta_o$, which would be 0° if the laser array was not "bowed", is related to the interference fringe period, d, by the following equation:

$$\theta_o = \text{Arcsin}\,([\lambda/d] - \sin\theta_r)$$

wherein $\theta_r$ is the off-axis reference beam angle 17 as illustrated in FIG. 2 and $\lambda$ is the wavelength of either the light emitted from the laser array or the reference beam since they are mutually coherent.

The object beam angle $\theta_o$ may be determined from the above equation by measuring d, as both $\lambda$ and $\theta_r$ are known quantities for a particular diode laser array 14 and a specific alignment of the reference beam 20. The object beam angle $\theta_o$ is determined for each individual diode of the diode laser array 14 as the individual diodes are misaligned by various amounts due to the non-linear "bowing".

Once an object beam angle $\theta_o$ has been calculated for each laser diode of the laser array 14, the grating period (r), i.e. the spacing between the rulings, for each individual diffraction grating 15 of the array 12 of diffraction gratings composing the binary alignment corrector 10 may be determined from the following equation:

$$r = \lambda/(\sin\theta_o + \sin\theta_b)$$

wherein $\theta_o$ is the object beam angle previously calculated and $\theta_b$ is the bias angle chosen as hereinafter explained.

The purpose of the binary alignment corrected 10 is to align the diode laser array's output 16 such that each laser diode's aligned output is on-axis, corresponding to an object beam angle $\theta_o$ 0° for each laser diode. Nevertheless, the binary alignment corrector 10 is typically designed to align each laser diode's output at a bias angle $\theta_b$ which is measured from an object beam angle $\theta_o$ of 0°. Standard prisms may then be used to compensate for the bias angle $\theta_b$ in the output of the binary alignment corrector, resulting in an output beam which is on-axis so as to have an ultimate object beam angle $\theta_o$ of 0° following alignment as desired.

A bias angle $\theta_b$ is typically utilized due to the inherent difficulties associated with manufacturing a diffraction grating to align a laser diode that is only misaligned by a minimal amount. As the amount of misalignment decreases, the grating period for the diffraction grating necessarily increases. For laser diodes with extremely small amounts of misalignment, the grating period goes to infinity which is impossible to fabricate. Thus, a bias angle $\theta_b$, at which each laser diode is aligned, is chosen which is larger than any anticipated beam directional errors so that each laser diode's output will vary by a significant angle from the bias angle $\theta_b$, allowing for the fabrication of a diffraction grating with a grating period that is easily manufacturable.

Following the determination of the grating period, r, for each diffraction grating 15 of the binary alignment corrector 10, the binary alignment corrector 10 may be fabricated. The binary alignment corrector 10 will be an array 12 of individual diffraction gratings, each of which may have gratings with a different grating period depending on the amount by which their corresponding laser diode is misaligned as previously calculated.

The width and height of each individual diffraction grating 15 is determined, as is well known to one who is skilled in the art, by the amount of deviation of the output beams, the distance between the diffraction grating and the laser array, and the spacing between individual diodes in the laser array. These determinations are guided by the desire to diffract as much of the output power of each diode as possible without encroaching upon the output path of an adjacent diode or making the laser array of binary alignment corrector unmanageably large. Additionally, the individual diffraction gratings 15 are typically immediately adjacent to another diffraction grating so that there is virtually no dead space, or unruled area, between the gratings.

The binary alignment corrector 10 is fabricated by the process disclosed by Veldkamp, et al. in U.S. Pat. No. 4,846,552 (hereinafter the '552 patent) which issued on July 11, 1989. The fabrication method disclosed by the '552 patent utilizes very large scale integration techniques to allow fine control over the periodicity and depth parameters of the binary planar optical elements, such as the binary alignment corrector, produced. The resultant binary planar optical elements are thus able diffract radiation with efficiencies greater than 90%.

In the preferred embodiment, a GaAs diode laser array 14 emitting radiation at a wavelength of 807 nanometers is utilized which has a maximum directional error of ±20 milliradians. A binary alignment corrector 10 is designed to align the GaAs diode laser array 14 with a bias angle $\theta_b$ of 1.643°. The bias angle $\theta_b$ is selected to be much larger than the maximum possible directional error. Thus, a diode of the laser array 14 which is aligned correctly, i.e. the object beam angle $\theta_o$ is 0°, will be deflected by its corresponding diffraction grating by 1.643°. The grating period, r, necessary to produce a deflection of 1.643° is 30 μm according to the previously discussed equation.

Figure 3:
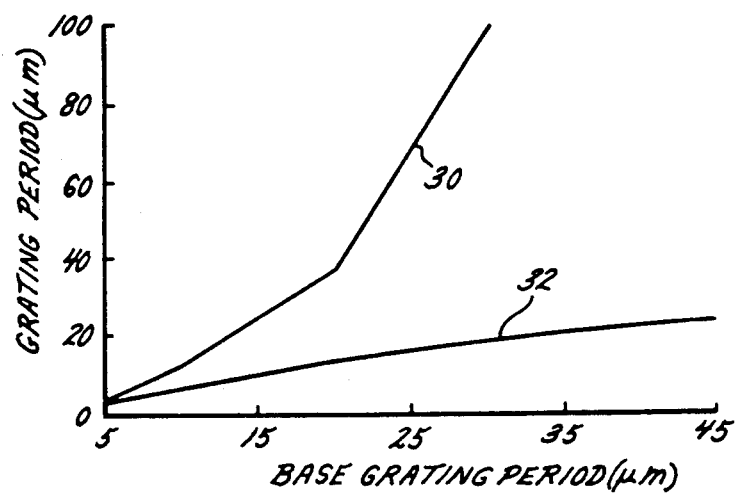
FIG. 3 is a graph depicting the range of grating periods required to compensate for a ±20 milliradian angular misalignment for various base grating periods.

FIG. 3 illustrates the relationship between the base grating period, the grating period necessary to produce a deflection in the amount of the bias angle $\theta_b$, and the grating periods required to compensate for various amounts of angular misalignment. The upper graph 30 depicts the grating period necessary to compensate for a −20 milliradian object beam angle $\theta_o$, while the lower graph 32 depicts the grating period necessary to compensate for a +20 milliradian object beam angle $\theta_o$. As shown in FIG. 3, a binary alignment corrector 10 utilizing a base grating period that is greater than 30 μm requires a very large grating period to compensate for a −20 milliradian object beam angle $\theta_o$. Thus, the selection of a bias angle $\theta_b$ of 1.643° and its corresponding base grating period of 30 μm is also advantageous due to its limiting the range of potential grating periods necessary to correct ±20 milliradian object beam angle $\theta_o$ to those periods between approximately 15 μm and 95 μm.

Figure 4:
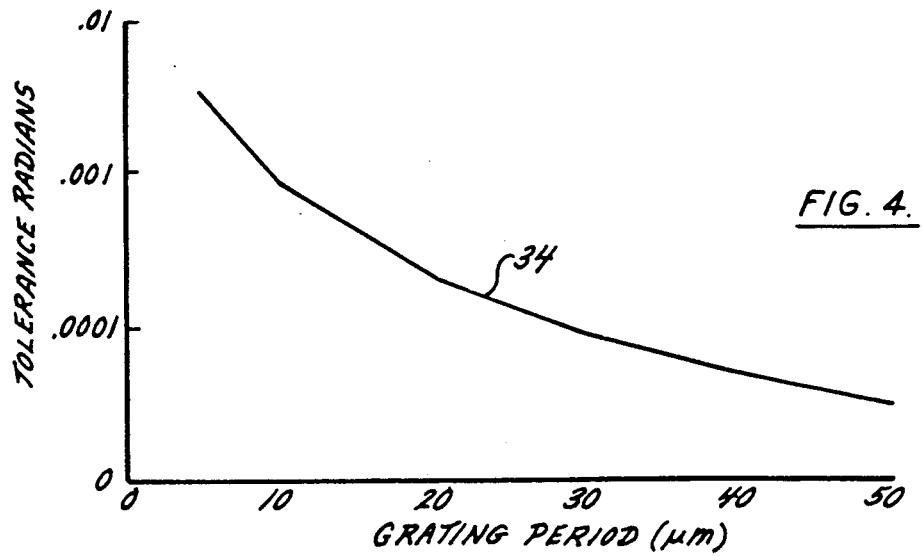
FIG. 4 is a graph depicting the alignment accuracy with which a diffraction grating will operate for various grating periods.

As the grating period of a particular diffraction grating is increased, the corresponding accuracy with which the laser beam is redirected improves as shown in FIG. 4. Curve 34 relates a given grating period to the accuracy with which the laser beam may be redirected, denoted tolerance radians on the vertical axis. For example, a grating period of 30 μm will have an accuracy within 0.0001 radians or 100 microradians. Thus, as illustrated by FIG. 4, current binary optics fabrication technology is precise enough to allow production of accurate diffraction gratings.

While the binary alignment corrector 10 has been illustrated as a means for providing alignment to individual diodes of a laser diode array 14, the corrector 10 could also be utilized as a variable beam splitter so as to sample portions of a single large laser beam and to redirect them to predetermined locations. In order to fabricate a variable beam splitter, the individual diffraction gratings 15 of the corrector 10 would provide predetermined angular adjustments to portions of a large laser beam so as to direct the portion of the laser beam to varied locations instead of a commonly aligned position.

Although there has been illustrated and described specific detail and structure of operations, it is clearly understood that changes and modifications may be readily made therein by those skilled in the art without departing from the spirit and the scope of the invention.

We claim:

1. A laser array alignment system, comprising:
   a) a laser array comprised of a plurality of individual laser diodes for emitting radiation; and
   b) an array of individual diffraction gratings wherein each individual diffraction grating corresponds to an individual laser diode in the laser diode array and each individual diffraction grating has a grating period selected to compensate for the angular misalignment of radiation of the corresponding individual laser diode.

2. A laser array alignment system as recited in claim 1, wherein each individual diffraction grating is a binary planar optical element.

3. A laser array alignment system as recited in claim 2, wherein the grating period of each individual diffraction grating is selected to align the radiation of each corresponding individual laser diode at a common bias angle.

4. A laser array alignment system as recited in claim 3, further comprising one or more lenses positioned to realign the radiation that has been aligned at a base angle by the aligning means.

5. An apparatus for aligning a plurality of laser beams, comprising a plurality of diffraction gratings wherein each individual diffraction grating corresponds to an individual laser beam and has a grating period selected to compensate for the angular misalignment of the corresponding individual laser beam.

6. An apparatus for aligning a plurality of laser beams as recited in claim 5, wherein the aligning apparatus is a binary planar optical element.

* * * * *